US011328598B2

(12) United States Patent
Uchiyama

(10) Patent No.: US 11,328,598 B2
(45) Date of Patent: May 10, 2022

(54) PARKING LOT GUIDANCE SYSTEM AND PARKING LOT GUIDANCE METHOD

(71) Applicant: Sharp NEC Display Solutions, Ltd., Tokyo (JP)

(72) Inventor: Akira Uchiyama, Tokyo (JP)

(73) Assignee: SHARP NEC DISPLAY SOLUTIONS, LTD., Tokyo (JP)

(*) Notice: Subject to any disclaimer, the term of this patent is extended or adjusted under 35 U.S.C. 154(b) by 0 days.

(21) Appl. No.: 17/271,137

(22) PCT Filed: Aug. 27, 2018

(86) PCT No.: PCT/JP2018/031525
§ 371 (c)(1),
(2) Date: Feb. 24, 2021

(87) PCT Pub. No.: WO2020/044392
PCT Pub. Date: Mar. 5, 2020

(65) Prior Publication Data
US 2021/0174683 A1 Jun. 10, 2021

(51) Int. Cl.
*G01C 21/08* (2006.01)
*G08G 1/04* (2006.01)
(Continued)

(52) U.S. Cl.
CPC ............. *G08G 1/143* (2013.01); *G01C 21/28* (2013.01)

(58) Field of Classification Search
CPC .................................................. G08G 1/143
See application file for complete search history.

(56) References Cited

U.S. PATENT DOCUMENTS

2013/0132102 A1* 5/2013 Andrade ................ G06Q 50/30
705/1.1
2013/0282472 A1 10/2013 Penilla et al.
(Continued)

FOREIGN PATENT DOCUMENTS

CN 103198693 A 7/2013
CN 106781674 A 5/2017
(Continued)

OTHER PUBLICATIONS

International Search Report (ISR) (PCT Form PCT/ISA/210), in PCT/JP2018/031525, dated Oct. 16, 2018.
(Continued)

*Primary Examiner* — Joseph H Feild
*Assistant Examiner* — Pameshanand Mahase
(74) *Attorney, Agent, or Firm* — McGinn IP Law Group, PLLC

(57) ABSTRACT

A parking lot guidance system includes: a determination unit configured to determine whether the parking lot is in a congested state based on a result of detection from a detection unit; a selection unit configured to select a predetermined number of empty spaces in the parking lot based on a determination from the determination unit; and a display unit configured to display the predetermined number of empty spaces. The selection unit selects the empty spaces from further inside in an extending direction of the vehicle passage in a first parking block which is a parking block including an empty space and being closer to a facility entrance provided at a position different from that of a parking lot entrance of the parking lot out of a plurality of parking blocks along a plurality of vehicle passages when the determination unit determines that the parking lot is in the congested state.

10 Claims, 11 Drawing Sheets

(51) Int. Cl.
*G08G 1/14* (2006.01)
*G07B 15/02* (2011.01)
*G01C 21/28* (2006.01)

(56) References Cited

U.S. PATENT DOCUMENTS

| | | | |
|---|---|---|---|
| 2014/0176348 A1* | 6/2014 | Acker, Jr. | G08G 1/146 |
| | | | 340/932.2 |
| 2016/0178382 A1 | 6/2016 | Kojo et al. | |
| 2017/0329341 A1 | 11/2017 | Rakshit et al. | |
| 2018/0043905 A1* | 2/2018 | Kim | B60W 50/14 |
| 2019/0041859 A1* | 2/2019 | Kim | G05D 1/0055 |
| 2019/0259277 A1* | 8/2019 | Dudar | G01C 21/3469 |

FOREIGN PATENT DOCUMENTS

| | | |
|---|---|---|
| CN | 107004349 A | 8/2017 |
| CN | 107074280 A | 8/2017 |
| CN | 108154705 A | 6/2018 |
| CN | 108230739 A | 6/2018 |
| JP | H07-44798 A | 2/1995 |
| JP | H07-249195 A | 9/1995 |
| JP | 2002-123895 A | 4/2002 |
| JP | 2004-118703 A | 4/2004 |
| JP | 2008-052670 A | 3/2008 |
| JP | 2009-063504 A | 3/2009 |

OTHER PUBLICATIONS

Japanese Notice of Allowance, dated Sep. 28, 2021, in Japanese Application No. 2020-539170 and English Translation thereof.
Chaojin Ye, "Fujian Architecture & Construction" No. 3, The Analysis of Parking Guidance System, 2015.
Saifil Allif A'ssri et al., "The Efficient Parking Bay Allocation and Management System Using LoRaWAN", 2017 IEEE 8th Control and System Graduate Research Colloquium (ICSGRC) 2017.
Chinese Office Action, dated Feb. 11, 2022, in Chinese Application No. 201880096924.2 and English Translation thereof.

* cited by examiner

| PARKING SPACE No. | BLOCK | PRIORITY LEVEL IN NORMAL STATE | PRIORITY LEVEL IN CONGESTED STATE | PRESENCE OF VEHICLE |
|---|---|---|---|---|
| P1 | (1) | 1 | 7 | NO |
| P2 | (1) | 2 | 9 | NO |
| P3 | (1) | 3 | 8 | NO |
| P4 | (1) | 4 | 10 | NO |
| P5 | (1) | 5 | 5 | NO |
| P6 | (1) | 6 | 6 | NO |
| P7 | (1) | 7 | 11 | NO |
| P8 | (1) | 8 | 12 | NO |
| P9 | (1) | 9 | 3 | NO |
| P10 | (1) | 10 | 4 | NO |
| P11 | (1) | 11 | 13 | NO |
| P12 | (1) | 12 | 14 | NO |
| P13 | (1) | 13 | 1 | NO |
| P14 | (1) | 14 | 2 | NO |
| P15 | (1) | 15 | 15 | NO |
| P16 | (1) | 16 | 16 | NO |
| P17 | (2) | 17 | 7 | NO |
| P18 | (2) | 18 | 9 | NO |
| P19 | (2) | 19 | 8 | NO |
| P20 | (2) | 20 | 10 | NO |
| P21 | (2) | 21 | 5 | NO |
| P22 | (2) | 22 | 6 | NO |
| P23 | (2) | 23 | 11 | NO |
| P24 | (2) | 24 | 12 | NO |
| P25 | (2) | 25 | 3 | NO |
| P26 | (2) | 26 | 4 | NO |
| P27 | (2) | 27 | 13 | NO |
| P28 | (2) | 28 | 14 | NO |
| P29 | (2) | 29 | 1 | NO |
| P30 | (2) | 30 | 2 | NO |
| P31 | (2) | 31 | 15 | NO |
| P32 | (2) | 32 | 16 | NO |
| P33 | (3) | 33 | 1 | NO |
| P34 | (3) | 34 | 9 | NO |
| P35 | (3) | 35 | 2 | NO |
| P36 | (3) | 36 | 10 | NO |
| P37 | (3) | 37 | 3 | NO |
| P38 | (3) | 38 | 4 | NO |
| P39 | (3) | 39 | 11 | NO |
| P40 | (3) | 40 | 12 | NO |
| P41 | (3) | 41 | 5 | NO |
| P42 | (3) | 42 | 6 | NO |
| P43 | (3) | 43 | 13 | NO |
| P44 | (3) | 44 | 14 | NO |
| P45 | (3) | 45 | 7 | NO |
| P46 | (3) | 46 | 8 | NO |
| P47 | (3) | 47 | 15 | NO |
| P48 | (3) | 48 | 16 | NO |
| P49 | (4) | 49 | 7 | NO |
| P50 | (4) | 50 | 5 | NO |
| P51 | (4) | 51 | 6 | NO |
| P52 | (4) | 52 | 3 | NO |
| P53 | (4) | 43 | 4 | NO |
| P54 | (4) | 54 | 1 | NO |
| P55 | (4) | 55 | 2 | NO |
| P56 | (5) | 56 | 7 | NO |
| P57 | (5) | 57 | 5 | NO |
| P58 | (5) | 58 | 6 | NO |
| P59 | (5) | 59 | 3 | NO |
| P60 | (5) | 60 | 4 | NO |
| P61 | (5) | 61 | 1 | NO |
| P62 | (5) | 62 | 2 | NO |

| PARKING SPACE No. | BLOCK | DISTANCE TO FACILITY ENTRANCE | PRIORITY LEVEL IN NORMAL STATE | DISTANCE FROM PARKING LOT ENTRANCE | PRIORITY LEVEL IN CONGESTED STATE |
|---|---|---|---|---|---|
| P1 | (1) | 5 (m) | 1 | 47 (m) | 7 |
| P2 | (1) | 5 (m) | 2 | 42 (m) | 9 |
| P3 | (1) | 10 (m) | 3 | 44 (m) | 8 |
| P4 | (1) | 11 (m) | 4 | 39 (m) | 10 |
| P5 | (1) | 12 (m) | 5 | 51 (m) | 5 |
| P6 | (1) | 14 (m) | 6 | 49 (m) | 6 |
| P7 | (1) | 15 (m) | 7 | 39 (m) | 11 |
| P8 | (1) | 15 (m) | 8 | 36 (m) | 12 |
| P9 | (1) | 17 (m) | 9 | 55 (m) | 3 |
| P10 | (1) | 19 (m) | 10 | 53 (m) | 4 |
| P11 | (1) | 21 (m) | 11 | 38 (m) | 13 |
| P12 | (1) | 21 (m) | 12 | 35 (m) | 14 |
| P13 | (1) | 23 (m) | 13 | 60 (m) | 1 |
| P14 | (1) | 25 (m) | 14 | 57 (m) | 2 |
| P15 | (1) | 25 (m) | 15 | 33 (m) | 15 |
| P16 | (1) | 26 (m) | 16 | 30 (m) | 16 |
| P17 | (2) | 27 (m) | 17 | 37 (m) | 7 |
| P18 | (2) | 27 (m) | 18 | 32 (m) | 9 |
| P19 | (2) | 30 (m) | 19 | 34 (m) | 8 |
| P20 | (2) | 31 (m) | 20 | 29 (m) | 10 |
| P21 | (2) | 32 (m) | 21 | 41 (m) | 5 |
| P22 | (2) | 34 (m) | 22 | 39 (m) | 6 |
| P23 | (2) | 35 (m) | 23 | 29 (m) | 11 |
| P24 | (2) | 35 (m) | 24 | 26 (m) | 12 |
| P25 | (2) | 36 (m) | 25 | 45 (m) | 3 |
| P26 | (2) | 37 (m) | 26 | 43 (m) | 4 |
| P27 | (2) | 39 (m) | 27 | 28 (m) | 13 |
| P28 | (2) | 40 (m) | 28 | 35 (m) | 14 |
| P29 | (2) | 40 (m) | 29 | 60 (m) | 1 |
| P30 | (2) | 42 (m) | 30 | 57 (m) | 2 |
| P31 | (2) | 43 (m) | 31 | 33 (m) | 15 |
| P32 | (2) | 46 (m) | 32 | 30 (m) | 16 |

FIG. 5

| PARKING SPACE No. | BLOCK | PRIORITY LEVEL IN NORMAL STATE | PRIORITY LEVEL IN CONGESTED STATE | PRESENCE OF VEHICLE |
|---|---|---|---|---|
| P1 | (1) | 1 | 7 | YES |
| P2 | (1) | 2 | 9 | NO |
| P3 | (1) | 3 | 8 | YES |
| P4 | (1) | 4 | 10 | YES |
| P5 | (1) | 5 | 5 | NO |
| P6 | (1) | 6 | 6 | NO |
| P7 | (1) | 7 | 11 | NO |
| P8 | (1) | 8 | 12 | NO |
| P9 | (1) | 9 | 3 | NO |
| P10 | (1) | 10 | 4 | YES |
| P11 | (1) | 11 | 13 | YES |
| P12 | (1) | 12 | 14 | YES |
| P13 | (1) | 13 | 1 | NO |
| P14 | (1) | 14 | 2 | NO |
| P15 | (1) | 15 | 15 | NO |
| P16 | (1) | 16 | 16 | NO |
| P17 | (2) | 17 | 7 | YES |
| P18 | (2) | 18 | 9 | YES |
| P19 | (2) | 19 | 8 | NO |
| P20 | (2) | 20 | 10 | YES |
| P21 | (2) | 21 | 5 | NO |
| P22 | (2) | 22 | 6 | NO |
| P23 | (2) | 23 | 11 | NO |
| P24 | (2) | 24 | 12 | NO |
| P25 | (2) | 25 | 3 | NO |
| P26 | (2) | 26 | 4 | YES |
| P27 | (2) | 27 | 13 | NO |
| P28 | (2) | 28 | 14 | YES |
| P29 | (2) | 29 | 1 | NO |
| P30 | (2) | 30 | 2 | NO |
| P31 | (2) | 31 | 15 | NO |
| P32 | (2) | 32 | 16 | NO |

FIG. 8

| PARKING SPACE No. | BLOCK | PRIORITY LEVEL IN NORMAL STATE | PRIORITY LEVEL IN CONGESTED STATE | PRESENCE OF VEHICLE |
|---|---|---|---|---|
| P1 | (1) | 1 | 7 | YES |
| P2 | (1) | 2 | 9 | NO |
| P3 | (1) | 3 | 8 | YES |
| P4 | (1) | 4 | 10 | YES |
| P5 | (1) | 5 | 5 | YES |
| P6 | (1) | 6 | 6 | NO |
| P7 | (1) | 7 | 11 | NO |
| P8 | (1) | 8 | 12 | NO |
| P9 | (1) | 9 | 3 | NO |
| P10 | (1) | 10 | 4 | YES |
| P11 | (1) | 11 | 13 | YES |
| P12 | (1) | 12 | 14 | YES |
| P13 | (1) | 13 | 1 | YES |
| P14 | (1) | 14 | 2 | YES |
| P15 | (1) | 15 | 15 | NO |
| P16 | (1) | 16 | 16 | NO |
| P17 | (2) | 17 | 7 | YES |
| P18 | (2) | 18 | 9 | YES |
| P19 | (2) | 19 | 8 | NO |
| P20 | (2) | 20 | 10 | YES |
| P21 | (2) | 21 | 5 | NO |
| P22 | (2) | 22 | 6 | NO |
| P23 | (2) | 23 | 11 | NO |
| P24 | (2) | 24 | 12 | NO |
| P25 | (2) | 25 | 3 | NO |
| P26 | (2) | 26 | 4 | YES |
| P27 | (2) | 27 | 13 | NO |
| P28 | (2) | 28 | 14 | YES |
| P29 | (2) | 29 | 1 | NO |
| P30 | (2) | 30 | 2 | NO |
| P31 | (2) | 31 | 15 | NO |
| P32 | (2) | 32 | 16 | NO |

PARKING LOT GUIDANCE SYSTEM AND PARKING LOT GUIDANCE METHOD

TECHNICAL FIELD

The present invention relates to a parking lot guidance system and a parking lot guidance method.

BACKGROUND ART

In parking lots which are accessorily provided in facilities, entry/exit of vehicles is often managed at an entrance/exit. In such a parking lot, when the number of vehicles of users increases, congestion of vehicles may occur in the parking lot or road traffic may be affected by vehicles standing by on a road with access to the parking lot. Accordingly, there is demand for smooth traffic guidance in parking lots which are accessorily provided in facilities. Techniques for efficiently parking a vehicle in a parking lot in association therewith are known.

Patent Literature 1 discloses an onboard information guidance device that acquires information from a parking lot, determines priority levels of parking areas such that the priority level becomes higher as a distance between the corresponding parking area and an accessway for connecting the parking lot to a facility such as a store becomes less, and sets a parking area with a higher priority level as a destination.

Patent Literature 2 discloses a parking lot guidance system that prints a number of an empty space furthest inward from an entrance of a parking lot as a designated parking position on a parking pass and guides a vehicle.

Patent Literature 3 discloses a parking lot management system that sets a priority level to be higher as a moving distance from a parking space to a pedestrian entrance/exit of a parking lot becomes less and displays information for guidance to a parking space with a higher priority level.

CITATION LIST

Patent Literatures

[Patent Literature 1]
Japanese Unexamined Patent Application, First Publication No. 2009-063504
[Patent Literature 2]
Japanese Unexamined Patent Application, First Publication No. 2004-118703
[Patent Literature 3]
Japanese Unexamined Patent Application, First Publication No. H7-249195

SUMMARY OF INVENTION

Technical Problem

In a parking lot which is accessorily provided in a facility, vehicles are likely to concentrate in the vicinity of an entrance of the parking lot or in the vicinity of an entrance of the facility, and a traffic jam of vehicles is likely to occur in the parking lot or at the entrance of the parking lot. In the parking lot, it is difficult to search for an empty space in a congested state, and a traffic jam is caused in a congested state in which there is a continuous line of vehicles.

However, when vehicles are guided in consideration of only a traffic jam in the parking lot, there is a problem in that a guidance destination is a parking space which is less convenient to a user.

In the information guidance device described in Patent Literature 1, since the information guidance device is configured to decrease priority levels of congested parking areas and to guide vehicles to non-congested parking areas in a congested state, convenience for a user in a congested state may decrease.

In the parking lot guidance system described in Patent Literature 2, since guidance to an empty space which is located furthest inward in the parking lot is performed, convenience for a user is insufficient, traffic in the parking lot in a congested state is not considered, and there is a likelihood that congestion will occur in the parking lot.

In the parking lot management system described in Patent Literature 3, convenience for a user is considered, but a flow of vehicles in the parking lot is not considered, and there is a likelihood that vehicles will concentrate in parking spaces with high convenience and a traffic jam will occur in the parking lot.

The invention was made in consideration of the aforementioned circumstances and an objective thereof is to provide a parking lot guidance system and a parking lot guidance method that can improve convenience for a user and reduce congestion in a parking lot.

Solution to Problem

One aspect of the present invention for solving the above-described problem is a parking lot guidance system including: a detection unit configured to detect a vehicle which uses a parking lot; a determination unit configured to determine whether the parking lot is in a congested state on the basis of a result of detection from the detection unit; a selection unit configured to select a predetermined number of empty spaces in the parking lot on the basis of a result of determination from the determination unit; and a display unit configured to display an image indicating the predetermined number of empty spaces, wherein the selection unit selects the empty spaces from further inside in an extending direction of the vehicle passage in a first parking block which is a parking block including an empty space and being closer to a facility entrance provided at a position different from that of a parking lot entrance of the parking lot out of a plurality of parking blocks along a plurality of vehicle passages when the determination unit determines that the parking lot is in the congested state.

In addition, one aspect of the present invention is a parking lot guidance method including: detecting a vehicle which uses a parking lot; determining whether the parking lot is in a congested state on the basis of a result of detection; selecting a parking block in ascending order of distance from a facility entrance which is provided at a position different from that of a parking lot entrance of the parking lot out of a plurality of parking blocks along a plurality of vehicle passages on the basis of the congested state when it is determined that the parking lot is in the congested state; selecting empty spaces from further inside in an extending direction of the corresponding vehicle passage out of a plurality of empty spaces included in the selected parking block; and displaying an image indicating a predetermined number of selected empty spaces.

In addition, one aspect of the present invention is a parking lot guidance method including: detecting a vehicle which uses a parking lot; determining whether the parking lot is in a congested state on the basis of a result of detection of the vehicle; selecting empty spaces from further inside in an extending direction of a vehicle passage in a first parking block which is a parking block including an empty space and being closer to a facility entrance provided at a position different from that of a parking lot entrance of the parking lot out of a plurality of parking blocks along a plurality of vehicle passages when it is determined that the parking lot is in the congested state; and displaying an image indicating a predetermined number of selected empty spaces.

Advantageous Effects of Invention

According to the invention, it is possible to improve convenience for a user and to reduce congestion in a parking lot.

BRIEF DESCRIPTION OF DRAWINGS

FIG. 3 is a diagram illustrating an example of a table in which parking spaces are correlated with priority levels.

FIG. 4 is a diagram illustrating an example of a table to which data of distances between parking spaces and a facility entrance is added.

FIG. 5 is a diagram illustrating an example of a table in which information about whether there is a detected parked vehicle is reflected.

FIG. 8 is a diagram illustrating an example of a table when a guidance process is being performed.

DESCRIPTION OF EMBODIMENTS

Hereinafter, an embodiment of a parking lot guidance system 1 according to the invention will be described with reference to the accompanying drawings.

Figure 1:
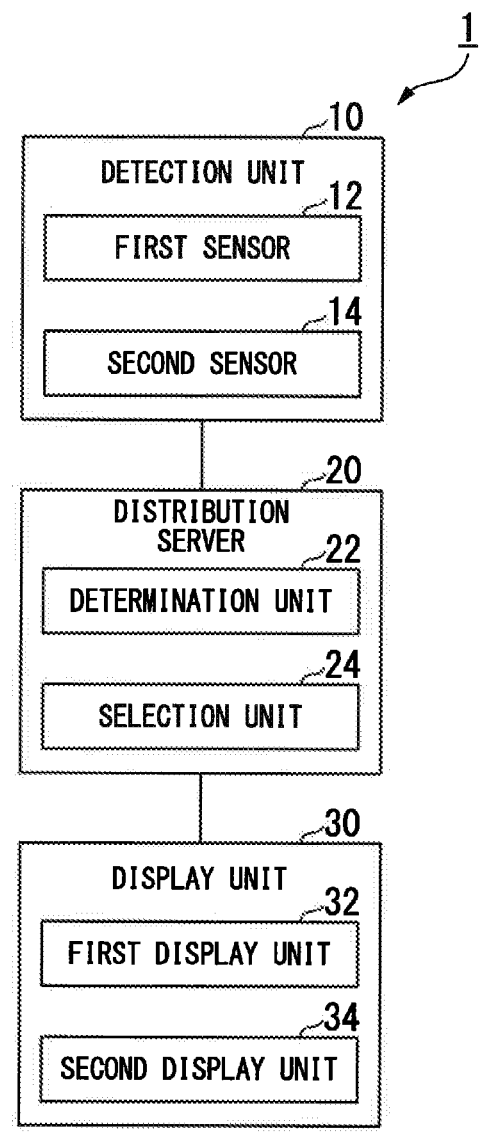
FIG. 1 is a block diagram illustrating an example of a configuration of a parking lot guidance system.

A parking lot guidance system is a system that guides a vehicle to the vicinity of a facility entrance, for example, in a parking lot which is accessorily provided in a facility and smooths the flow of traffic in the parking lot. FIG. 1 is a block diagram illustrating an example of a configuration of the parking lot guidance system 1. The parking lot guidance system 1 includes, for example, a detection unit 10 that detects a vehicle which uses the parking lot, a distribution server 20 that performs an arithmetic operation for guiding a vehicle on the basis of a result of determination from the detection unit 10, and a display unit 30 that displays information for guiding a vehicle on the basis of a result of operation from the distribution server 20.

The detection unit 10 includes, for example, a plurality of sensors that detect a degree of congestion of vehicles which use the parking lot. The plurality of sensors are, for example, sensors that are provided at an entrance, an exit, a vehicle passage, and a parking space in the parking lot and detect a vehicle. As each sensor, for example, a camera, an acoustic sensor, an optical sensor, an electromagnetic sensor, or a combination thereof is used. Each sensor is installed in a predetermined device of a ceiling, a road surface, or the like depending on a shape of the parking lot or an installation place. The detection unit 10 includes, for example, a first sensor 12 that detects the number of vehicles standing by at an entrance of the parking lot.

The detection unit 10 further includes a second sensor 14 that detects a vehicle in each parking space. The second sensor detects, for example, whether a vehicle is present in each parking space. For example, the second sensor is provided on the ceiling of each parking space when the parking lot is indoors, and is provided in a chassis installed on a road surface or rising upward from the road surface or the like when the parking lot is outdoors. The second sensor may detect whether a vehicle is present in a plurality of parking spaces on the basis of image analysis using a camera provided at a high position.

The detection unit 10 further includes a sensor (not illustrated) that detects entry/exit of a vehicle at an entrance or an exit and a sensor (not illustrated) that detects a vehicle in a vehicle passage in the parking lot. The detection unit 10 outputs a result of detection from the first sensor 12 and the second sensors 14 to the distribution server 20.

The distribution server 20 is realized, for example, by a terminal device such as a personal computer (PC). The distribution server 20 is communicatively connected to the detection unit 10 and the display unit 30. The distribution server 20 acquires the result of detection output from the detection unit 10. The distribution server 20 displays display details for guiding a vehicle on the display unit 30 on the basis of the result of detection.

The distribution server 20 may not be provided in the parking lot and may communicate with the detection unit 10 or the display unit 30 via a communication line from a remote place which is distant from the parking lot. The distribution server 20 includes a determination unit 22 and a selection unit 24.

The determination unit 22 determines whether the parking lot is in a congested state, for example, on the basis of the result of detection from the detection unit 10. Here, congestion of vehicles means, for example, at least three states (1) to (3):

(1) a state in which a predetermined number of vehicles passing for parking or stopping are present in the parking lot or in the parking lot entrance, that is, a state in which there are many vehicles not having parked in parking spaces (vehicles which are going to park);

(2) a state in which vehicles parks in parking spaces of the parking lot at a predetermined parking ratio or more; and (3) a state in which there are many vehicles entering the parking lot from the parking lot entrance per unit time.

For example, in order to determine the state (1), the determination unit 22 determines that the parking lot is in the congested state when a predetermined number of (for example, three) successive vehicles or more are detected on the basis of the result of detection of vehicles detected by the first sensor 12 provided at the parking lot entrance.

For example, in order to determine the state (2), the determination unit 22 determines that the parking lot is in the congested state when a parking ratio is equal to or greater than a predetermined value on the basis of the result of detection of vehicles detected by the second sensors provided in the parking spaces.

In addition, in order to determine the state (3), the determination unit 22 determines that the parking lot is in the congested state when the number of vehicles entering the parking lot from the parking lot entrance per unit time is equal to or greater than a predetermined number of vehicles on the basis of the result of detection of vehicles detected by the first sensor 12.

The selection unit 24 selects appropriate empty spaces out of a plurality of empty spaces to guide vehicles such that a traffic jam does not occur in the parking lot. Users of the parking lot often desire a parking space at a position closer to a facility entrance for their own convenience. The facility entrance is, for example, a passage or an entrance facility with access to a facility which is provided at a position different from the parking lot entrance of the parking lot. However, when empty spaces are selected to guide vehicles to the empty spaces from a position close to the facility entrance, there is a likelihood that vehicles will concentrate at parking spaces in the vicinity of the facility entrance and cause a traffic jam.

When guidance for causing vehicles to park from further inside the parking lot is simply performed in consideration of a traffic jam, a situation in which vehicles are guided to parking spaces distant from the facility entrance or the like may occur and thus convenience for a user decreases. Therefore, the selection unit 24 selects the empty spaces on the basis of a balance between convenience for a user and curbing of a traffic jam.

For example, when the determination unit 22 determines that the parking lot is in the congested state, the selection unit 24 selects one vehicle passage out of a plurality of vehicle passages which are provided in a plurality of parking blocks. The selection unit 24 selects the vehicle passage in ascending order of distance from the facility entrance.

The selection unit 24 selects empty spaces in which vehicles will park from further inside in a traveling direction of the vehicles out of a plurality of empty spaces connected to the selected vehicle passage. Detailed processes of the selection unit 24 will be described later.

The distribution server 20 causes the display unit 30 to display an image of the selected empty spaces. The display unit 30 displays image content for marking three empty spaces with higher priority levels on the basis of priority levels which were previously calculated out of the empty spaces as will be described later.

The display unit 30 includes, for example, a first display unit 32 and a second display unit 34. For example, the first display unit 32 is provided in the vicinity of an entrance of the parking lot and displays information of empty spaces and visually guides a driver when a vehicle enters the parking lot (see FIG. 2).

Figure 2:
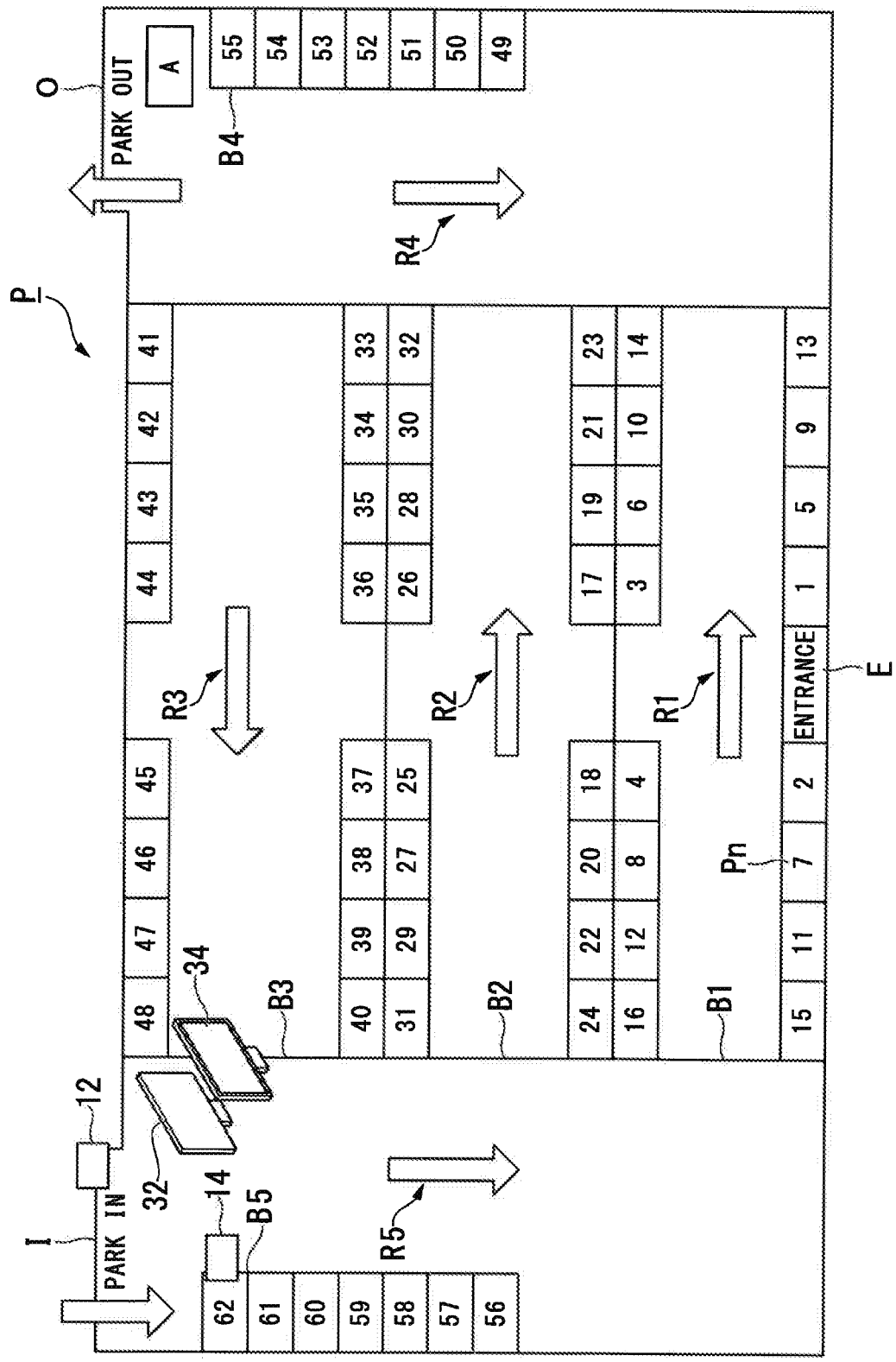
FIG. 2 is a diagram illustrating an example of a layout of a parking lot.

For example, the second display unit 34 is provided at a position which is visible to a driver from a position at which the vehicle returns to the entrance after traveling around the parking lot in the vehicle passage of the parking lot (see FIG. 2). Information for allowing a driver to park a vehicle at a parking space again when the driver has passed by the guided parking space or when another vehicle has parked in the guided parking space is displayed on the second display unit 34.

The first display unit 32 and the second display unit 34 are, for example, display devices that display a display subject such as guidance information to a parking space in the parking lot. The display unit 30 employs, for example, a display device such as a liquid crystal display, a light emitting diode (LED) display, an organic electro-luminescence (EL) display, an electric bulletin board.

Specific operations of the parking lot guidance system 1 will be described below. Various types of layouts can be considered for a parking lot. The operations of the parking lot guidance system 1 will be described on the premise of an example of a layout of a parking lot and arrangement positions of the devices which will be described below.

As illustrated in FIG. 2, a parking lot P is partitioned into a plurality of parking blocks including a plurality of parking spaces S. In this embodiment, a group of a plurality of parking spaces which are accessed from a vehicle passage R is defined as a parking block and parking blocks B1 to B5 are set to correspond to five parking passages.

Each vehicle passage R is set, for example, as one-way traffic in each parking block. Each vehicle passage R may be set as two-way traffic. In this case, the vehicle passage R is defined for each traffic direction. The traffic direction and the layout of each vehicle passage R are set to correspond to the layout of the parking lot P for the purpose of a smooth traffic flow in the parking lot P.

The parking spaces Pn (n: natural number) are numbered according to a distance from a facility entrance E. As illustrated in FIG. 3, a table T in which the parking spaces Pn, the parking blocks, priority levels in a normal state (a state other than the congested state), priority levels in the congested state, and information about whether a vehicle is present are correlated is set in a storage device (not illustrated) of the distribution server 20. The table T is normally updated at a predetermined timing with information about whether a vehicle is present according to a parking situation of the parking lot P on the basis of a result of detection from the detection unit 10.

As illustrated in FIG. 4, the priority levels in the table T in the normal state are calculated, for example, using a table T1 in which distance data between the parking spaces Pn and the facility entrance E is added to the table T.

The determination unit 22 determines whether the parking lot P is in the congested state with reference to the table T in which the result of detection from the detection unit 10 is reflected. The determination unit 22 determines whether a parking lot entrance I is congested on the basis of the result of detection from the first sensor 12. When the determination unit 22 determines that the parking lot entrance I is not congested, the selection unit 24 starts a guidance process in the normal state.

The selection unit 24 extracts three empty spaces with higher priority levels out of parking spaces Pn (empty spaces) in which no vehicle parks and which are recommended to the display unit 30 with reference to the table T in the guidance process in the normal state. That is, the selection unit 24 selects empty spaces from a side closer to the facility entrance E in the normal state.

In the example illustrated in FIG. 2, there are parking spaces Pn of which the distances from the facility entrance E are the same. In this case, any parking space may be set to a higher priority level. In this embodiment, the parking space Pn in which a numerical value assigned thereto is smaller is set to a higher priority level.

The selection unit 24 generates data of image contents (display details) in which three empty spaces are marked and transmits the generated data to the first display unit 32 and the second display unit 34. The first display unit 32 and the second display unit 34 receive the data of display details and display the image contents (an image) with a predetermined number of empty spaces to visually guide a driver.

Empty states of the parking spaces Pn vary normally. Accordingly, when a vehicle has parked in one or more parking spaces Pn out of the three parking spaces Pn (empty spaces) displayed on the first display unit 32 and the second display unit 34, the selection unit 24 selects three parking spaces in the descending order of priority levels out of the other parking spaces with reference to the table T again.

The selection unit 24 guides a vehicle by causing the first display unit 32 and the second display unit 34 to display information of the selected empty spaces.

When this process is being performed, a congestion situation of the entrance I based on the result of detection from the first sensor 12 is normally determined by the determination unit 22. A congestion situation of the parking spaces Pn based on the result of detection from the second sensor 14 is normally determined by the determination unit 22.

The determination unit 22 acquires information about whether a vehicle is present in each parking space Pn on the basis of the output value of the second sensor 14. Then, the determination unit 22 calculates a parking ratio of the parking spaces Pn on the basis of the acquired information and a parking ratio of the parking spaces Pn on the basis of the acquired information.

When the determination unit 22 determines that the entrance I or the parking spaces Pn are in the congested state, the selection unit 24 stores the empty situation, discards contents for a guidance process which is being prepared or is going to be transmitted, and forcibly starts the guidance process in the congested state.

First, the selection unit 24 performs a process of partitioning the vehicle passages in the parking lot into parking blocks. For example, the selection unit 24 performs grouping of the parking spaces Pn with reference to the table T (see FIG. 3). The groups to which the parking spaces Pn belong are set in advance on the basis of relationships with positions of the vehicle passages, for example, when the parking spaces Pn are numbered. The set groups are recorded in the table T.

Then, the selection unit 24 sets rankings based on the priority levels in the normal state for the parking blocks with reference to the table T. The selection unit 24 calculates the priority levels in the normal state on the basis of distances to the facility entrance with reference to a table T1 (see FIG. 4). A vehicle passage R including a parking space with a first priority level is supposed to be a passage with the highest priority level in the normal state.

The selection unit 24 compares the parking blocks B1 to B5 in the priority level of the parking space Pn with the highest priority level in the normal state out of the parking spaces Pn in each parking block B. Here, the higher priority level means the less numerical value.

The selection unit 24 performs the same process on the parking blocks B2 to B5 other than the parking block B1 and then performs a process of calculating the vehicle passage closest to the facility entrance E to the end.

The selection unit 24 ranks the parking blocks using the priority level of the parking space with the highest priority level out of the parking spaces included in each parking block as a representative priority level of the corresponding parking block. With such ranking, the parking block B1 has a first rank, the parking block B2 has a seventeenth rank, the parking block B3 has a thirty-third rank, the parking block B4 has a forty-ninth rank, and the parking block B5 has a fifty-sixth rank. The selection unit 24 ranks the parking blocks in the order of the parking block B1, the parking block B2, the parking block B3, the parking block B4, and the parking block B5.

Through this process, the selection unit 24 ranks the plurality of parking blocks B1 to B5 in the ascending order of distances from the facility entrance E and selects a parking block on the basis of the rankings in the process in the congested state. After preparing the rankings, the selection unit 24 calculates the priority levels of the parking spaces Pn in each of the parking blocks B1 to B5 which are used for the process in the congested state. The selection unit 24 sets the priority levels in the congested state, for example, in the ascending order of distances from the parking lot entrance along a route from the corresponding parking spaces to the parking lot entrance (see FIG. 4).

Specifically, in each of the parking blocks B1 to B5, the selection unit 24 ranks the priority levels such that the priority levels of the parking spaces Pn ascend from further inside in the extending direction of the vehicle passage. That is, the selection unit 24 sets the parking space located further inward in the parking lot P has the highest priority level in each of the parking blocks B1 to B5.

When the parking lot is in the congested state, the selection unit 24 selects empty spaces from further inside in the extending direction of the vehicle passage in the parking block which includes an empty space and which is closest to the facility entrance E out of a plurality of parking blocks along a plurality of vehicle passages.

In the guidance process in the normal state, the priority levels of 1 to 62 are calculated for all the parking spaces Pn in the parking lot. On the other hand, in the guidance process in the congested state, the priority levels of 1 to m (where m is the number of empty spaces to which guidance is performed) in each of the parking blocks B1 to B5 are calculated according to the congested state of the parking space Pn, and thus a process load is decreased.

Through this process, the selection unit 24 prepares image contents (an image) for displaying a predetermined number of empty spaces in only the parking block B1 and transmits the prepared image contents to the display unit 30. The predetermined number of empty spaces is three based on the priority levels.

The parking block B1 is a passage closest to the facility entrance E and there is no large difference in distance to the facility entrance E between a parking space with a low priority level in the normal state in the parking block B1 and a parking space with the same priority level in the parking block B2. Accordingly, when guided vehicles concentrate in the parking block B1, there is a high likelihood that vehicles will be able to park relatively smoothly in the parking block B2 in comparison with the parking block B1.

Therefore, when the number of empty spaces in the parking block B1 is equal to or less than a reference (½) of the number of parking spaces Pn in the parking block, the selection unit 24 performs a process of adding three empty spaces with highest priority levels in the parking block B2 of a second rank out of the parking blocks to guidance destinations in addition to a process of extracting a predetermined number of (for example, three) empty spaces with highest priority levels in the parking block B1. The value of the reference or the predetermined number may be appropriately changed.

In this way, the selection unit 24 prepares image contents for displaying a total of six empty spaces to which guidance will be performed and causes the display unit 30 to display the image contents to guide vehicles, whereby it is possible to reduce congestion in the parking lot P.

When an empty space displayed on the display unit 30 is occupied, the selection unit 24 additionally extracts an empty space on the basis of the priority levels from the parking block of the highest rank as described above to generate new image contents. At this time, when the parking block of the highest rank is already full, the selection unit 24 extracts an empty space from empty spaces of a parking block of a second highest rank.

When the maximum number of empty spaces which are displayed for guidance on the display unit 30 is excessively large, there is a likelihood that a driver will not be able to be aware in what space to park. Accordingly, for example, by setting the maximum number of empty spaces which are displayed to six, the selection unit 24 continues to perform the process without increasing the number of empty spaces which are displayed even if the number of empty spaces in the parking block B2 as well as the parking block B1 becomes a half.

That is, when the number of empty spaces in the (first) parking block B1 is equal to or less than the reference, the selection unit 24 selects fewer empty spaces than a predetermined number of empty spaces from the parking block B1 and selects the residual number of empty spaces from the parking block B2 different from the parking block B1.

This process is a process corresponding to temporary congestion. Accordingly, when the determination unit 22 determines that the number of successive vehicles at the parking lot entrance is equal to or less than three on the basis of the result of detection from the first sensor 12, the selection unit 24 performs the guidance process in the normal state immediately.

A process of partitioning parking blocks which is performed by the selection unit 24 when the parking lot P is in the congested state will be described below. First, when partitioning of the parking blocks is performed, an area including a plurality of parking spaces Pn connected to one vehicle passage from a start point to an end point of the vehicle passage is defined as one parking block. For example, a total of five parking blocks are set (see FIG. 2).

In the guidance process in the congested state, the selection unit 24 extracts parking spaces Pn of which a distance along a route from the parking lot entrance I is large for the vehicle passage R1 of the parking block B1 of a high rank. Accordingly, the parking lot guidance system 1 can guide vehicles to parking spaces as close to the facility entrance E to as possible while reducing congestion in the parking lot.

A process which is performed by the parking lot guidance system 1 after three successive vehicles have entered the parking lot from the parking lot entrance I as described above will be described below. In addition to the aforementioned conditions, it is assumed that there is a vehicle which is parking in the parking lot P earlier than the three vehicles and the parking lot P is appropriately congested.

Figure 6:
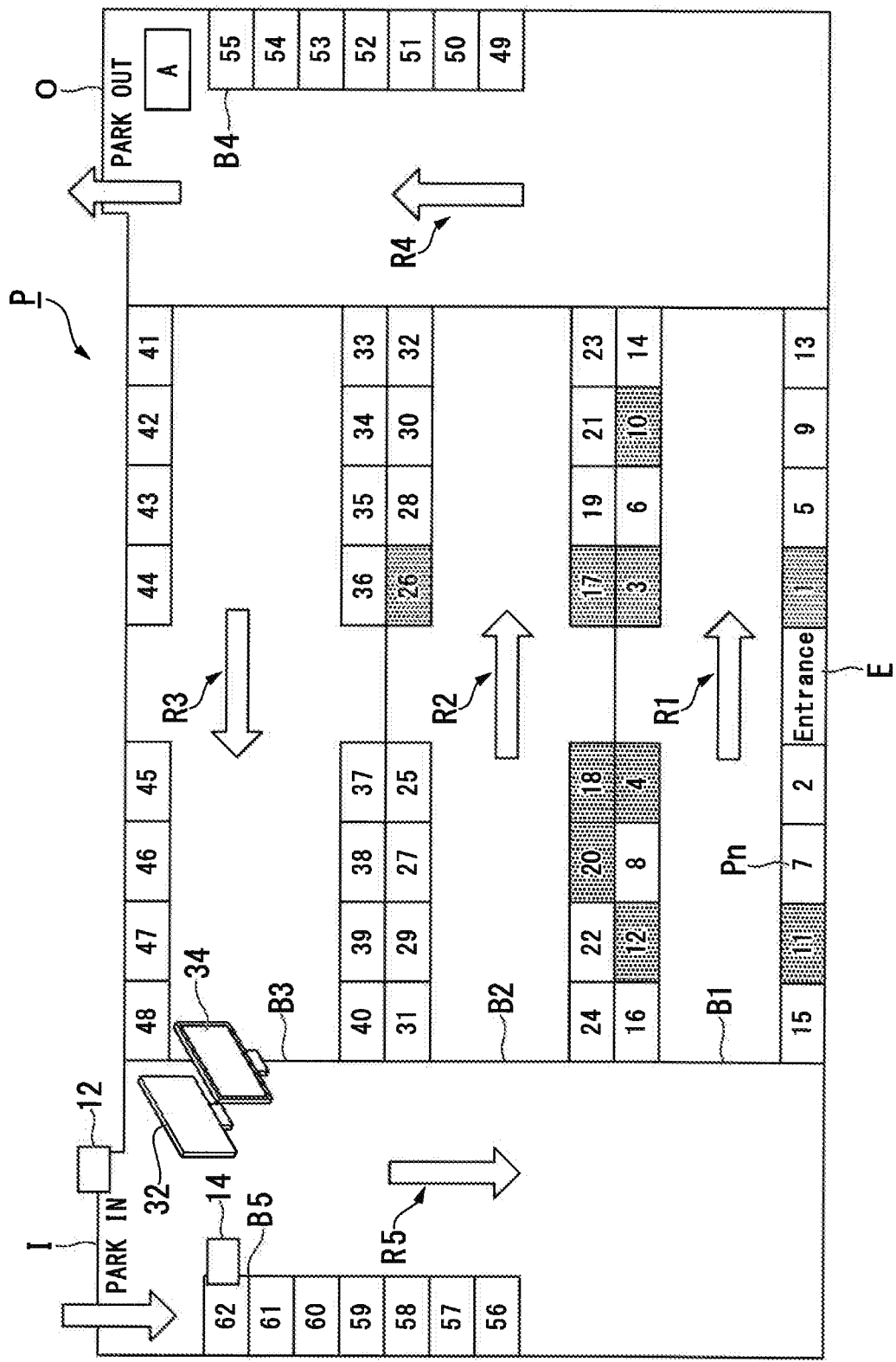
FIG. 6 is a diagram illustrating an example of a parking lot state in which vehicles are present.

As illustrated in FIG. 5, the congested state of the parking lot P before the three vehicles have entered the parking lot is recorded in the table T. As illustrated in FIG. 6, the selection unit 24 acquires information of states of the parking spaces Pn in the parking lot P with reference to the table T.

In the aforementioned situation, the selection unit 24 first selects the parking block B1 which is ranked the highest in priority level out of the parking blocks with reference to the table T.

Figure 7:
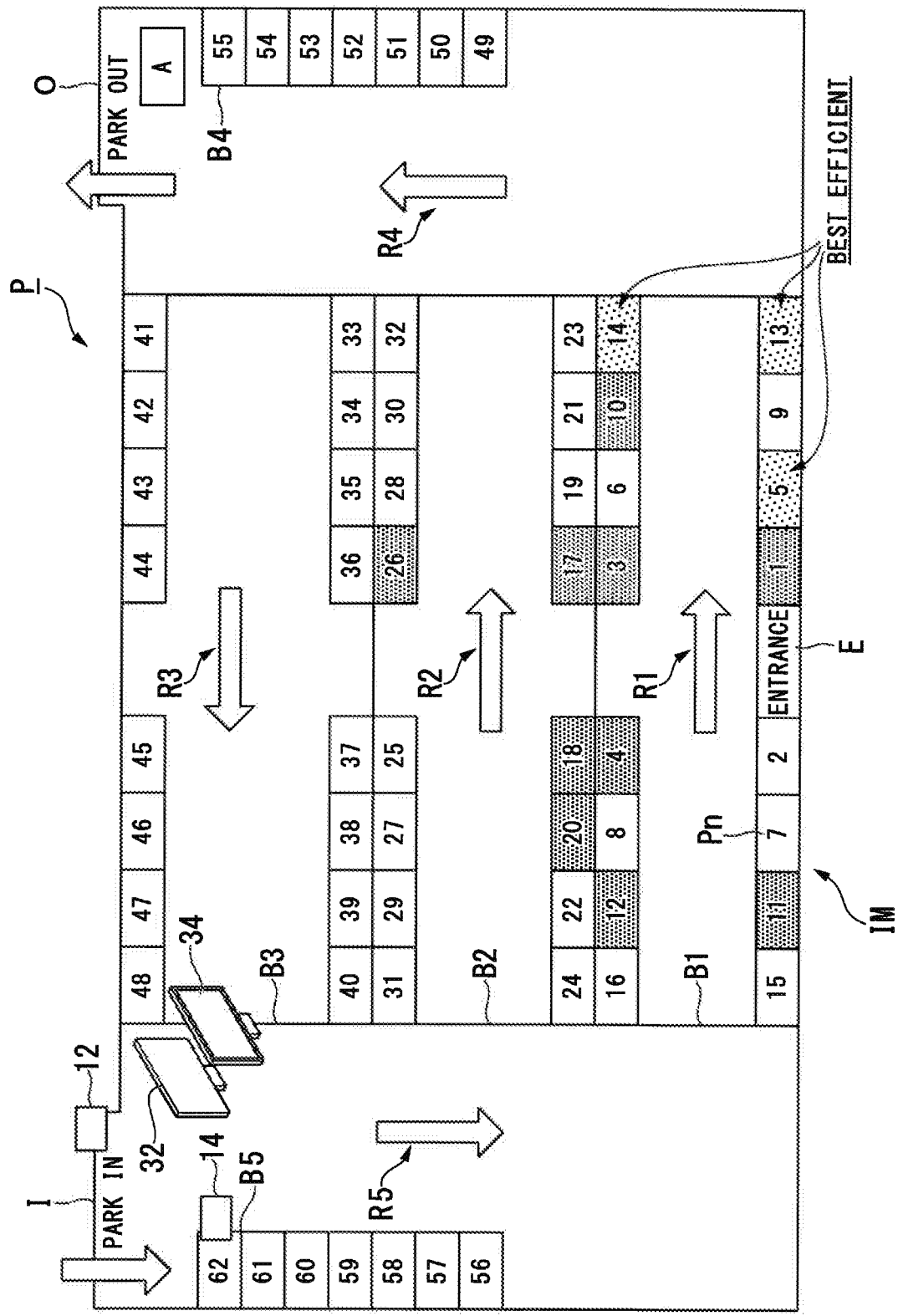
FIG. 7 is a diagram illustrating an example of image content representing empty spaces in a parking lot in which parked vehicles are present.

The selection unit 24 extracts, for example, three parking spaces P13, P14, and P5 with highest priority levels out of empty spaces in the parking block B1 on the basis of the priority levels. As illustrated in FIG. 7, the selection unit 24 prepares image contents IM for guidance in which the parking spaces P13, P14, and P5 are emphasized, and causes the display unit 30 to display the image contents.

Thereafter, the three vehicles which are guided enter the parking lot P and travel to the parking spaces P13, P14, and P5 which are displayed in the image contents IM. At this time, the selection unit 24 may perform, for example, a guidance process of turning on a lamp of the parking space P13 such that a lead vehicle of the three successive vehicles parks in the parking space P13 further inward in the parking block B1.

For example, after the lead vehicle has parked in the parking space P13, similarly, the selection unit 24 may perform a guidance process of turning on a guide lamp such as a lamp of the parking space P14 such that a next following vehicle parks in the parking space P14 further inward.

If the aforementioned process is not performed and the priority levels in the congested state are simply calculated using a method of ranking the priority levels in the descending order of distances along a route from the parking lot entrance, a vehicle is guided to, for example, the parking space P48 or the parking space P40 in the parking block B3.

According to this guidance process, for example, even when there is an empty space in the parking spaces of the parking block B1, vehicles are not uniformly guided to the parking spaces in the parking block B1.

On the other hand, if the priority levels in the congested state in FIG. 6 are calculated using a ranking method in the ascending order of distances along a route from the facility entrance E, vehicles are guided to, for example, the parking spaces P2, P7, and P8 in the parking block B1. For example, since a following vehicle stands by while a preceding vehicle is parking in the parking space P2, there is a likelihood of congestion occurring.

On the other hand, with the parking lot guidance system 1, it is possible to perform a process of ranking the parking blocks and selecting empty spaces such that vehicles park to first fill the deepest space in the parking block B1 close to the facility entrance E. As a result, with the parking lot guidance system 1, even when the parking lot P is in the congested state, it is possible to reduce congestion in the parking lot and to guide a vehicle to a parking space close to the facility entrance E which is highly convenient for a user.

Figure 9:
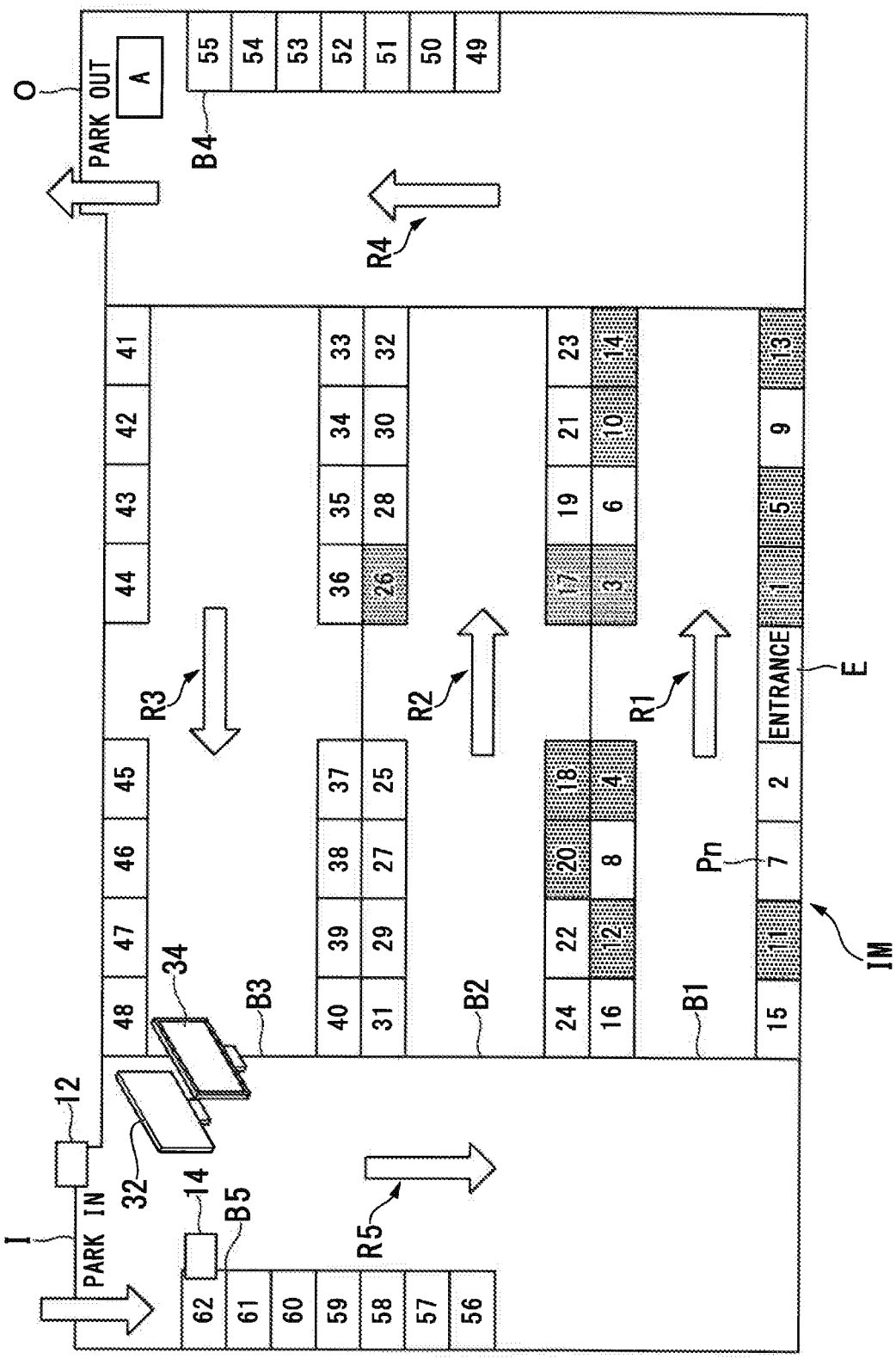
FIG. 9 is a diagram illustrating an example of a parking lot state when the guidance process is being performed.

As illustrated in FIGS. 8 and 9, a process after three vehicles have parked in empty spaces will be described below. For example, when five successive vehicles are detected by the first sensor 12 and the determination unit 22 determines that the parking lot is in the congested state, the selection unit 24 performs the following process depending on the number of detected vehicles. The selection unit 24 selects the parking block B1 on the basis of the priority levels of the parking spaces as described above.

When the number of empty spaces in the parking block B1 is equal to or less than the reference of the number of parking spaces therein, the selection unit 24 selects the parking block B2 of a second highest rank such that vehicles are distributed and park in another parking block, and selects empty spaces to which vehicles are distributed from the parking block B2.

For example, when the number of empty spaces in the parking block B1 which has been first selected is equal to or less than the reference of the number of parking spaces therein, the selection unit 24 selects fewer empty spaces than a predetermined number of empty spaces from the parking block B1 and selects the residual number of empty spaces from the parking block of a second highest rank.

In this situation, since the number of empty spaces in the parking block B1 is less than the reference (for example, the number corresponding to a halt) of the number of parking spaces therein, for example, the selection unit 24 selects three empty spaces with higher priority levels which are a half the predetermined number from the parking block B1 and selects three empty spaces with highest priority levels from the parking block B2.

Figure 10:
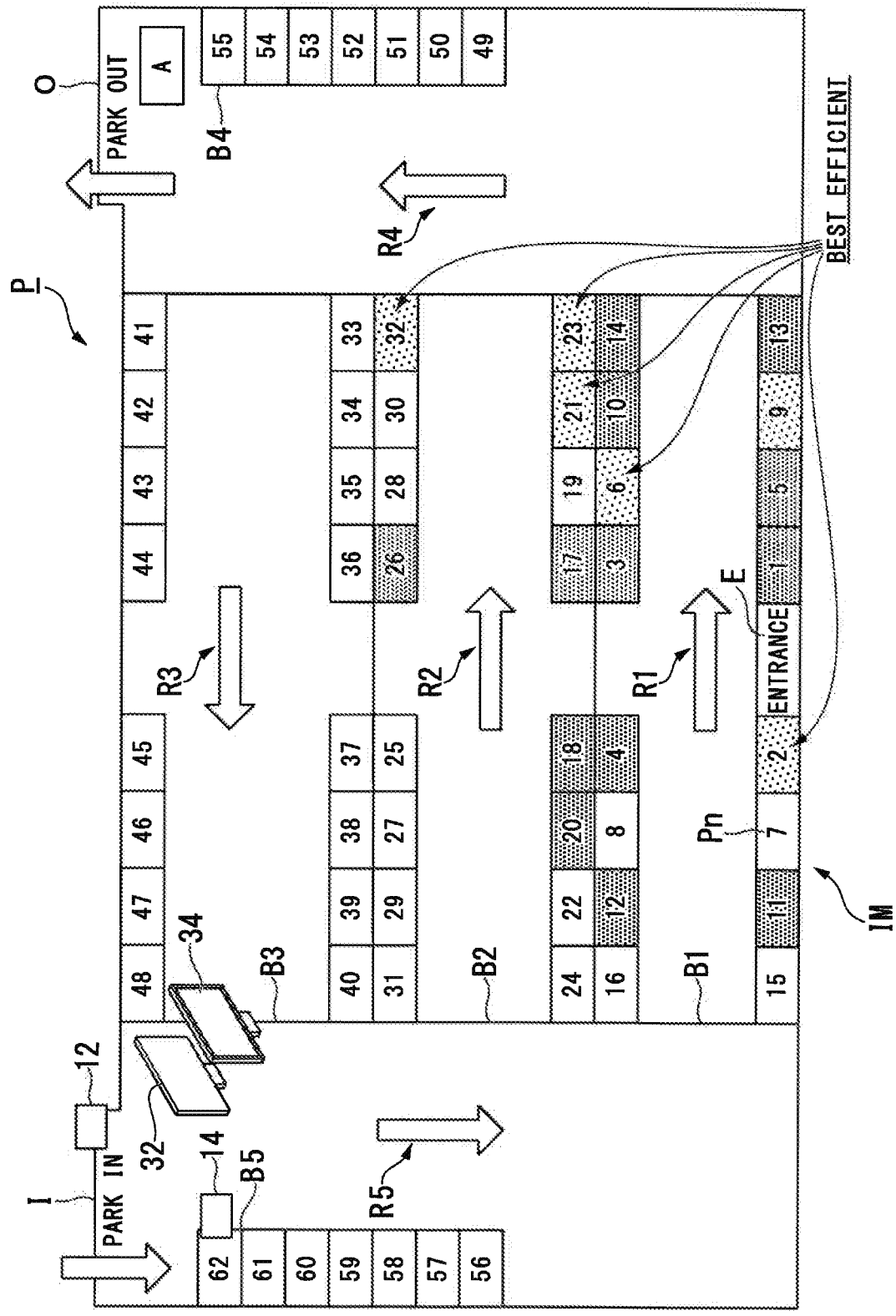
FIG. 10 is a diagram illustrating an example of image content representing empty spaces in two parking blocks.

As illustrated in FIG. 10, the display unit 30 displays image contents IM of a total of six selected empty spaces.

Since the parking block B1 is a passage closest to the facility entrance E but the number of parking spaces therein is limited, there is a likelihood of congestion when vehicles park in the vicinity of the start point of the vehicle passage R1 of the parking block B1. Accordingly, the selection unit 24 prevents congestion from occurring in the parking lot P by distributing vehicles to the parking block B2.

As a result, in consideration of a period of time required for movement from the parking lot entrance to the facility entrance, it is possible to enable smooth parking and to shorten a period of time required for a user's parking, by distributing vehicles to a parking block which is lightly distant in comparison with a case in which the vehicles stand by in the parking block B1 until a preceding vehicle parks.

Figure 11:
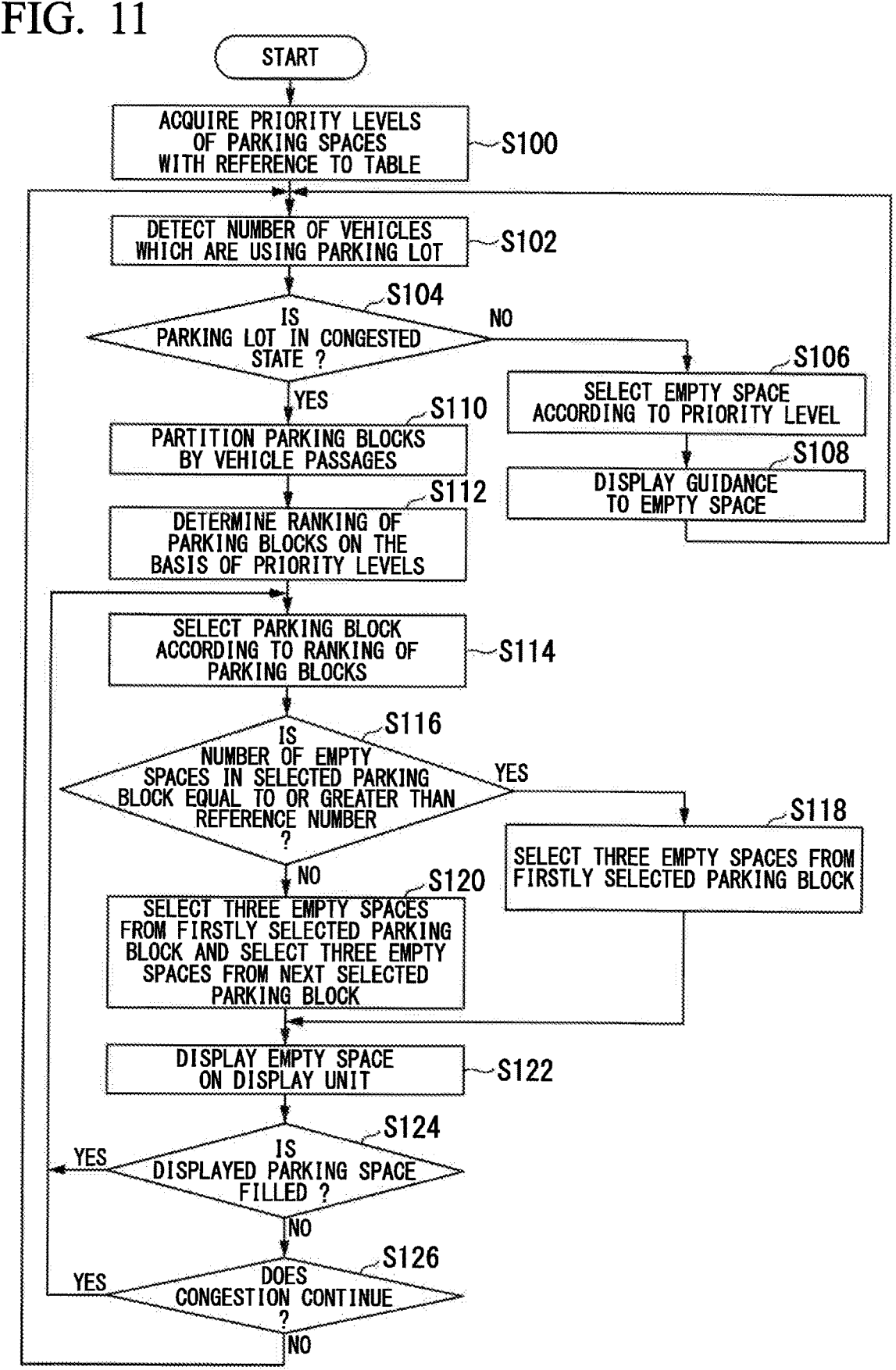
FIG. 11 is a flowchart illustrating an example of a flow of processes which are performed by the parking lot guidance system.

A flow of processes which are performed by the parking lot guidance system 1 will be described below. FIG. 11 is a flowchart illustrating an example of a flow of processes which are performed by the parking lot guidance system 1.

The selection unit 24 acquires priority levels of parking spaces Pn with reference to a table T (Step S100). The detection unit 10 detects the number of vehicles which use the parking lot P (Step S102). The determination unit 22 determines whether the parking lot P is in a congested state on the basis of a result of detection from the detection unit 10 (Step S104).

When the determination result of Step S104 is negative, the selection unit 24 selects empty spaces on the basis of the priority levels (Step S106). The display unit 30 displays display details for guidance to the empty spaces (Step S108). After Step S108, the flow of processes returns to Step S102. When the determination result of Step S104 is positive, the selection unit 24 partitions a plurality of parking spaces into parking blocks by vehicle passages (Step S110).

The selection unit 24 determines ranks of the parking blocks on the basis of the priority levels (Step S112). The selection unit 24 selects one parking block on the basis of the ranks of the parking blocks (Step S114). The selection unit 24 determines whether the number of empty spaces in the selected parking block is equal to or greater than a reference (Step S116).

When the determination result of Step S116 is positive, the selection unit 24 selects three empty spaces from the first selected parking block (Step S118). After Step S118, the flow of processes proceeds to Step S122.

When the determination result of Step S116 is negative, the selection unit 24 selects three empty spaces from the first selected parking block and selects three empty spaces from the parking block of a second highest rank (Step S120). The display unit 30 displays display details for guidance to the empty spaces (Step S122).

The determination unit 22 determines whether the parking spaces which are displayed are occupied on the basis of output values of the second sensors 14 (Step S124). When the determination result of Step S124 is positive, the flow of processes returns to Step S114. When the determination result of Step S124 is negative, the determination unit 22 determines whether the parking lot P continues to be congested on the basis of an output value of the detection unit 10 (Step S126).

When the determination result of Step S126 is positive, the flow of processes returns to Step S114. When the determination result of Step S126 is negative, the flow of processes returns to Step S102.

The constituents of the determination unit 22 and the selection unit 24 are realized, for example, by causing a hardware processor such as a central processing unit (CPU) to execute a program (software). Some or all functions of the constituents may be realized in hardware (which includes circuitry) such as a large-scale integration circuit (LSI), an application-specific integrated circuit (ASIC), a field programmable gate array (FPGA), or a graphics processing unit (GPU), or may be realized by cooperation of software and hardware. The program may be stored in a storage device such as a hard disk drive (HDD) or a flash memory in advance, or may be stored in a removable storage medium such as a DVD or a CD-ROM and be installed by attaching the storage medium to a drive device. The computer program may be transmitted to a computer via a communication line and the computer receiving the computer program may execute the program.

That is, a program which is executed by the distribution server 20 causes a computer mounted in the distribution server 20 to perform a process including:

detecting a vehicle which uses a parking lot;

determining whether the parking lot is in a congested state on the basis of a result of detection;

selecting empty spaces from further inside in an extending direction of a vehicle passage in a first parking block which is a parking block including an empty space and being closer to a facility entrance provided at a position different from that of a parking lot entrance of the parking lot out of a plurality of parking blocks along a plurality of vehicle passages when it is determined that the parking lot is in the congested state; and displaying an image indicating a predetermined number of selected empty spaces.

As described above, with the parking lot guidance system 1, it is possible to improve convenience for a user and to reduce congestion in a parking lot. With the parking lot guidance system 1, it is possible to perform guidance of a vehicle in comparison and consideration of convenience for a user and reduction in congestion depending on a real-time change of a congested state of a parking lot.

The invention is not limited to the aforementioned embodiment, and modifications, improvements, and the like in a range in which the objective of the invention can be achieved are included in the invention. For example, the aforementioned definition of priority levels may be set, for example, on the basis of distances from a parking lot exit as well as distances from a facility entrance. In addition, the embodiment may be modified such that a process of filling parking spaces from further inside the parking lot instead of allowing vehicles to park from parking spaces closer to a facility entrance is performed.

REFERENCE SIGNS LIST

1 . . . Parking lot guidance system
10 . . . Detection unit
12 . . . First sensor
14 . . . Second sensor
20 . . . Distribution server
22 . . . Determination unit
24 . . . Selection unit
30 . . . Display unit
32 . . . First display unit
34 . . . Second display unit
B, B1 to B5 . . . Parking block
E . . . Facility entrance
IM . . . Image contents
P . . . Parking lot
PC . . . Personal computer Pn . . . Parking space
Rn . . . Vehicle passage
S . . . Parking space
T, T1 . . . Table

The invention claimed is:

1. A parking lot guidance system comprising:
a detection unit configured to detect a vehicle which uses a parking lot;
a determination unit configured to determine whether the parking lot is in a congested state on the basis of a result of detection from the detection unit;
a selection unit configured to select a predetermined number of empty spaces in the parking lot on the basis of a result of determination from the determination unit; and
a display unit configured to display an image indicating the predetermined number of empty spaces,
wherein the selection unit selects the empty spaces from further inside in an extending direction of the vehicle passage in a first parking block which is a parking block including an empty space and being closer to a facility entrance provided at a position different from that of a parking lot entrance of the parking lot out of a plurality of parking blocks along a plurality of vehicle passages when the determination unit determines that the parking lot is in the congested state.

2. The parking lot guidance system according to claim 1, wherein the selection unit selects the empty spaces from a side close to the facility entrance when the determination unit determines that the parking lot is not in the congested state.

3. The parking lot guidance system according to claim 1, wherein the selection unit determines the predetermined number on the basis of the congested state determined by the determination unit.

4. The parking lot guidance system according to claim 3, wherein the selection unit selects fewer of the empty spaces than the predetermined number of empty spaces in the first parking block and selects the residual number of empty spaces in a parking block other than the first parking block when the number of empty spaces in the first parking block is equal to or less than a reference.

5. The parking lot guidance system according to claim 1, wherein the detection unit detects the number of vehicles which are present in the parking lot entrance within a predetermined time, and
wherein the determination unit determines that the parking lot is in the congested state when successive vehicles equal to or more than a reference are detected at the parking lot entrance on the basis of the result of detection from the detection unit.

6. The parking lot guidance system according to claim 1, wherein the detection unit detects the number of vehicles in the parking blocks, and
wherein the determination unit determines that the parking lot is in the congested state when a parking ratio of the parking blocks is equal to or greater than a predetermined value on the basis of the result of detection from the detection unit.

7. The parking lot guidance system according to claim 1, wherein the detection unit detects the number of vehicles entering the parking lot from the parking lot entrance per unit time, and
wherein the determination unit determines that the parking lot is in the congested state when the number of vehicles per unit time is equal to or greater than a predetermined number of vehicles on the basis of the result of detection from the detection unit.

8. The parking lot guidance system according to claim 1, wherein the detection unit updates a table in which a plurality of parking spaces in the parking lot, the parking blocks, priority levels of the parking spaces in a normal state other than the congested state, priority levels of the parking spaces in the congested state, and information about whether a vehicle is present are correlated at a predetermined timing on the basis of the result of detection,
wherein the determination unit determines whether the parking lot is in the congested state with reference to the table, and
wherein the selection unit selects the empty spaces according to the priority levels with reference to the table on the basis of the result of determination from the determination unit.

9. A parking lot guidance method comprising:
detecting a vehicle which uses a parking lot;
determining whether the parking lot is in a congested state on the basis of a result of detection;
selecting a parking block in ascending order of distance from a facility entrance which is provided at a position different from that of a parking lot entrance of the parking lot out of a plurality of parking blocks along a plurality of vehicle passages on the basis of the congested state when it is determined that the parking lot is in the congested state;
selecting empty spaces from further inside in an extending direction of the corresponding vehicle passage out of a plurality of empty spaces included in the selected parking block; and
displaying an image indicating a predetermined number of selected empty spaces.

10. A parking lot guidance method comprising:
detecting a vehicle which uses a parking lot;
determining whether the parking lot is in a congested state on the basis of a result of detection of the vehicle;
selecting empty spaces from further inside in an extending direction of a vehicle passage in a first parking block which is a parking block including an empty space and being closer to a facility entrance provided at a position different from that of a parking lot entrance of the parking lot out of a plurality of parking blocks along a plurality of vehicle passages when it is determined that the parking lot is in the congested state; and
displaying an image indicating a predetermined number of selected empty spaces.

* * * * *